(12) United States Patent
Drisdelle et al.

(10) Patent No.: US 6,336,449 B1
(45) Date of Patent: Jan. 8, 2002

(54) SOLID FUEL BURNER FOR A HEATING APPARATUS

(75) Inventors: Mark Drisdelle, Hudson; Claude Lapointe, Blainville, both of (CA)

(73) Assignee: Dell-Point Combustion Inc., Blainville (CA)

( * ) Notice: Subject to any disclaimer, the term of this patent is extended or adjusted under 35 U.S.C. 154(b) by 0 days.

(21) Appl. No.: 09/403,032

(22) PCT Filed: Apr. 24, 1998

(86) PCT No.: PCT/CA98/00392

§ 371 Date: Feb. 4, 2000

§ 102(e) Date: Feb. 4, 2000

(87) PCT Pub. No.: WO98/48219

PCT Pub. Date: Oct. 29, 1998

(30) Foreign Application Priority Data

Apr. 24, 1997 (CA) ............................................. 2203573
Mar. 24, 1998 (CA) ............................................. 2226654

(51) Int. Cl.⁷ ................................................ F24B 13/04
(52) U.S. Cl. ........................... 126/73; 126/77; 126/107; 126/112; 126/152 R; 126/245; 110/233; 110/300; 110/188; 110/110; 110/165 R
(58) Field of Search .............................. 126/73, 68, 77, 126/58, 540, 542, 543, 554, 555, 107, 112, 146, 245, 242, 25 R, 152 R, 155; 110/165 R, 166, 294, 293, 233, 110, 185, 186, 188, 297, 300; 431/337, 351

(56) References Cited

U.S. PATENT DOCUMENTS

| | | |
|---|---|---|
| 85,062 A | 12/1868 | Bronson |
| 857,806 A | 6/1907 | Hohenadel et al. |
| 863,269 A | 8/1907 | Dillon |
| 919,553 A | 4/1909 | Dillon |
| 1,133,200 A * | 3/1915 | Tipple |
| 4,348,211 A | 9/1982 | Zimmerman |
| 4,416,250 A * | 11/1983 | Kuzia ........................ 126/146 |
| 4,532,913 A * | 8/1985 | Murase ........................ 126/77 |
| 4,738,205 A | 4/1988 | Beierle et al. |
| 4,782,765 A | 11/1988 | Miller et al. |
| 5,133,266 A * | 7/1992 | Cullen ........................ 126/58 |
| 5,243,963 A | 9/1993 | Riener |
| 5,331,943 A | 7/1994 | Ko |
| 5,429,110 A | 7/1995 | Burke et al. |
| 5,582,117 A | 12/1996 | Mendive et al. |
| 5,607,487 A | 3/1997 | Taylor |
| 5,873,256 A * | 2/1999 | Vossler et al. .............. 126/112 |

FOREIGN PATENT DOCUMENTS

| | | | |
|---|---|---|---|
| DE | 108295 | * 1/1900 | .................. 126/73 |
| DE | 16073 | * 4/1904 | .................. 126/73 |
| DE | 42 00 721 A1 | 8/1992 | |
| EP | 0 246 147 | 11/1987 | |
| EP | 0 716 265 A1 | 6/1996 | |
| EP | 0 754 907 A2 | 1/1997 | |
| FR | 2 343 970 | 10/1977 | |

* cited by examiner

Primary Examiner—Ira S. Lazarus
Assistant Examiner—Josiah C. Cocks

(57) ABSTRACT

A burner system is described for burning granular pellets and similarly sized solid biomass heating fuel, e.g. wood pellets. It includes an air tight fire chamber having an exhaust outlet in an upper region thereof and a burner (10) in the bottom thereof for converting the solid fuel to fuel gases and ash in the presence of a limited air supply and combusting the gases formed. The burner comprises upright co-axial inner (12) and outer (11) cylindrical walls providing a confined central gasification/combustion chamber surrounded by an annular combustion air manifold (15). The annular combustion air manifold (15) is closed at the top and bottom with an air inlet (16) in the outer wall and a plurality of spaced aperatures (17) arranged in upward rows in the inner cylindrical wall providing air inlets from the combustion air manifold to the combustion zone of the chamber. A grate at the bottom of the gasification/combustion chamber holds the solid fuel while allowing ash to pass through the grate.

14 Claims, 3 Drawing Sheets

SOLID FUEL BURNER FOR A HEATING APPARATUS

TECHNICAL FIELD

This invention relates to burner systems for burning granules, pellets or similarly sized solid biomass heating fuel. It relates more particularly to a burner system that incorporates a close-coupled pyrolysis gasifier.

BACKGROUND ART

Pellet burners or stoves are in wide use. Such burners typically use a biomass fuel in the form of small pellets of about 6 mm in diameter and about 25 mm in length made from waste from wood processing industries. Such pellets typically have a heat value of approximately 8,500 BTU's per pound (19.8 MJ/kg).

Pellet burners are generally considered to have advantages over conventional stick wood burning stoves. One advantage is that substantially less emissions are produced by pellet burners than by wood burners. Also, most pellet burning stoves meet environmental emission standards. Pellet burning stoves typically achieve a higher efficiency than conventional wood stoves and some rather extravagant claims have been made as to this efficiency.

In Wood Energy Institute News, Jan. 19, 1992, Daniel Malcon explained that a problem with pellet stoves lies in heat transfer efficiency, i.e. how much of the potential heat created by the fire is actually delivered into the home. Pellet stoves typically operate with high excess air, e.g. an air:fuel ratio greater than 35:1, and as this air goes through the stove and out the chimney, it evacuates heat that would otherwise be transferred to the home. Thus, even if flue temperatures are relatively low, the volume of air is so great that much of the heat is lost out the flue. As a result, typical existing pellet stoves have an average overall efficiency, i.e. the percentage of potential heat delivered into the room, in the order of about 50%.

Another problem that has been encountered with pellet stoves is that they tend to be very sensitive to the quality of the pellets being fed. Thus, pellets having a high ash content tend to produce slag upon combustion and form clinkers which further reduce efficiency and increase maintenance requirements. Typical current pellet stoves cannot operate with pellets containing more than about 1 to 3% ash.

Miller et al., U.S. Pat. No. 4,782,765, issued Nov. 8, 1988, describes a pellet burner which includes a retort means in which the pellets are heated to approximately 590° C. and combustion gases rising from these heated pellets are combusted while reaching temperatures in the order of 1200 to 1370° C. This system utilizes a bottom auger feed for the pellets with combustion air being supplied from a central perforated tube. Because of the manner in which the air contacts the bed of pellets being fed upwardly from the bottom, the burner can only operate with high excess air and is not capable of variable control.

Another pellet stove is described in Beierle et al., U.S. Pat. No. 4,738,205, issued Apr. 19, 1998. In that system, the pellets are fed into a gasifier and the gasifier is operated to produce carbon and fuel gas. In this design, the produced fuel gas and carbon are drawn down from the bottom of the gasifier and by means of a blower are moved through an exit nozzle and a tubular pipe into a burner section. This is a complicated and difficult system to operate and also can operate only with high excess air.

It is an object of the present invention to provide a simple and inexpensive pellet burner that is capable of operating with pellets containing as much as 10% ash. This would greatly expand the scope of biomass materials that could be used for pellets.

It is a further object of the present invention to provide a very simple design of pyrolysis/gasification chamber which is capable of combusting the high ash pellets without the formation of fusion products such as slag and clinkers.

It is a still further object of the present invention to provide a pellet burner capable of consistently operating at high overall efficiencies in the order of 85%.

Yet another object of the invention is to provide a pellet burner having a controlled variable combustion air flow while operating at a much lower air:fuel ratio than conventional pellet stoves.

DISCLOSURE OF THE INVENTION

The present invention in its broadest aspect relates to a burner system for burning pellets or granules of solid biomass heating fuel comprising an air tight fire chamber having an exhaust outlet in an upper region thereof and a burner in the bottom thereof for converting the solid fuel to fuel gases and ash in the presence of a limited air supply and combusting the gases formed. The burner comprises upright co-axial inner and outer cylindrical walls providing a confined central gasification/combustion chamber surrounded by an annular combustion air manifold. The annular combustion air manifold is closed at the top and bottom with an air inlet in the outer wall and a plurality of spaced apertures arranged in upward rows in the inner cylindrical wall providing air inlets from the combustion air manifold to the combustion zone of the chamber. A grate at the bottom of the gasification/combustion chamber holds the solid fuel while allowing ash to pass through the grate. An air tight ash-receiving chamber is provided below the gasification/combustion chamber and fan means are provided for producing a negative pressure in the gasification/combustion chamber to thereby draw combustion air into and upwardly through the chamber. In this way, solid fuel fed to the grate at the bottom of the gasification/combustion chamber is pyrolyzed in the presence of a limited air supply to form combustion gases which are drawn upwardly through the gasification/combustion chamber while contacting heated combustion air entering through the spaced air inlets.

This is operated as an air-tight system with the only exterior connections being an inlet for combustion air and an exhaust gas outlet.

The location and size of the combustion air inlet holes is an important feature of this invention and these are spaced in a upward path along the length of the inner cylindrical wall. They are preferably arranged in the form of at least two spiral paths extending up the wall with the most preferred system being a pair of spiral arrays of inlet holes arranged as mirror image spiral paths on opposite sides of the inner cylindrical wall.

The pellets are fed into the gasification/combustion chamber either from a top feeder or a bottom feeder and rest on the grate at the bottom. In that location, the pellets receive a very limited combustion air supply sufficient only to raise the temperature in the pellets to about 480 to 590° C., i.e. below melting temperatures of the minerals that may be present. At this temperature, gases are released and rise within the combustion zone where they are super-combusted with controlled flow of hot combustion air. The spiral array of combustion air inlet holes is located sufficiently far above the pellets being gasified on the grate so as to induce by negative pressure the gases and flames away from the grate area, thereby keeping the pellets on the grate below the temperature at which slag and clinkers are formed. The duel spiral array of air inlet holes arranged in the above manner cause the introduction of super heated combustion air into the chamber with a vertically swirling and turbulent motion which results in very complete burning of the gases emanating from the solid fuel below. This complete burning is achieved at temperatures in the order of 1200 to 1370° C. without the need of a large excess of air and this means that the flow of exhaust gas is substantially reduced compared to conventional pellet stove appliances. The burner of this invention operates very efficiently at air:fuel ratios of less than 8:1 and an excess air level of no more than 100%.

An important feature of the burner arrangement of the invention is that because of the low combustion air flows and the manner of introducing the combustion air, the system produces very low particulate emission levels and little airborne fly ash even with the use of high ash fuels. The combustion air flow can also be varied and closely controlled. This means that it is possible to operate the burner over a wide range of heat outputs. For instance, a residential pellet stove using the burner system of this invention can be operated at heat outputs ranging from 4,415 to 28,900 BTU/hr (10.3 to 67.2 MJ/kg) by varying the fuel flow and combustion air flow. In other words, the combustion air flow is varied in accordance with the fuel input for optimum operation.

According to a preferred feature, the system includes an oxygen sensor so as to substantially increase the overall steady state efficiency level by controlling the combustion air level to pellet fuel quantity ratio and rate of burn within the chamber. The amount of combustion air to the zone in which the gases are burned is regulated by the oxygen sensor in proportion to the amount of pellet fuel being combusted. The oxygen sensor employs a feedback loop to a main control system for the burner, which controls the fan motor speed supplying the induced combustion air being drawn through the combustion zone. The oxygen sensor measures oxygen concentrations between lean (any oxygen in the exhaust system not being utilized to combust pellets) to rich in oxygen (when there is not enough oxygen for the amount of fuel present in the combustion zone). The oxygen sensor balances the level of air to fuel so as to maintain an optimum rate of burn, which in turn effects the efficiency level of the combustion process. This oxygen sensor is conveniently located in the exhaust system to monitor the exhaust gases.

The pellets are preferably held in a storage container in the form of a hopper with a fuel auger system lifting pellets from the bottom of the hopper up to a feed chute for directing the pellets into the top end of the gasification/combustion chamber. The rate of feeding of the pellets is controlled by the rotational speed of the auger. With this top feeding system, there is the advantage that the pellets falling down through the combustion zone are preheated so that they quickly reach the pyrolysis temperature of about 480 to 590° C. Also, if the fuel has high moisture, much of this can be removed as the pellets fall through the combustion zone.

It is also possible to feed the pellets directly into the bottom of the burner. For this arrangement, a generally horizontal auger moves the pellets from a storage hopper directly onto the grate beneath the gasification/combustion chamber.

The burner system of this invention is capable of efficiently burning solid biomass heating fuel containing as high as 10% ash without the formation of fusion products such as slag and clinkers. In a typical prior pellet stove, problems are usually encountered with pellets containing more than about 1 to 3% ash. Higher ash contents have tended to result in fusion products forming on the grate and also obstructing air holes, necessitating a shutdown of the prior pellet stoves to remove this interfering material.

The solid biomass fuel used in the burner system of this invention is typically processed fuels of increased bulk density. These may be formed from many different materials, such as pellets from typical lignocellulose materials, e.g. wood chips or sawdust. They may also be formed from agricultural residues such as cherry pits, olive pits, etc. which may be used without modification. It is also possible to produce pellets from cheap and specially grown various forms of grasses and vegetable matters as feedstock. It will be understood that wherever the term "pellets" is used throughout this text, it is referring to any type of processed biomass fuel of increased bulk density.

The grate for supporting the pellets is preferably formed of a plurality of three sided metal rods having a predetermined distance between them. Thus, they are arranged so that each rod has a central peak and a pair of downwardly inclined faces. The space between adjacent rods is slightly less than the diameter of the fresh pellets being used. When the pellets become carbonized, they are small enough to drop through between the rods of the grate. Loose ash also slides down the inclined faces. According to a particularly preferred feature, a pair of grates are used, one below the other. When the pair of grates are used, the lower grate tends to hold material that has dropped through the upper grate which is not fully carbonized so that the burning may be completed on the second grate. Whether one or a pair of grates is used, a vibrating means may be used to assist the substantially carbonized biomass fuel to fall through the grate(s).

The burner system of this invention typically includes two blowers. A combustion air blower is provided preferably in the exhaust system for drawing combustion air in through the burner and out through the exhaust. This provides a negative pressure in the gasification/combustion chamber. A convection blower circulates air around the fire chamber and into a room for heating. The blowers and the fuel auger may be powered by either AC or DC motors. Because of the small amount of energy required, it is particularly desirable to use DC motors. Not only is such a system very safe, but it provides a further advantage that the system can be powered by a 12 volt battery in the event of an electrical power failure.

BRIEF DESCRIPTION OF THE DRAWINGS

Preferred embodiments of the invention are illustrated in the accompanying drawings, in which.

BEST MODES FOR CARRYING OUT THE INVENTION

Figure 1:
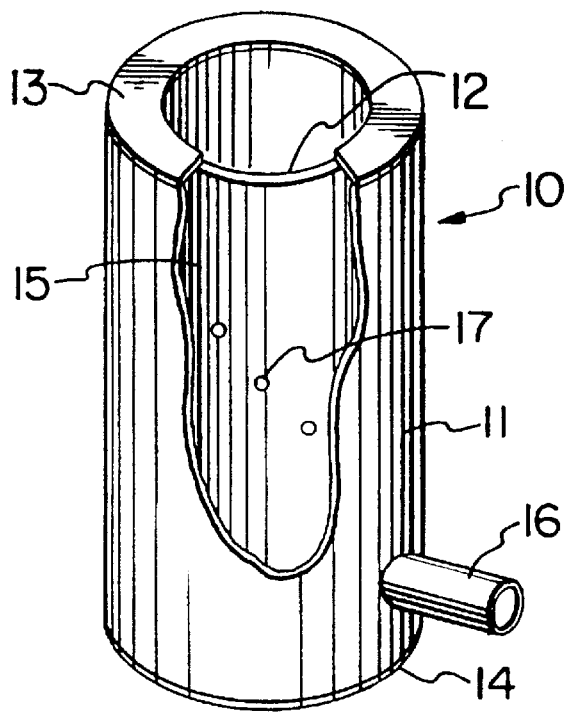
FIG. 1 is a fragmentary perspective view of a burner according to the invention.
Figure 2:
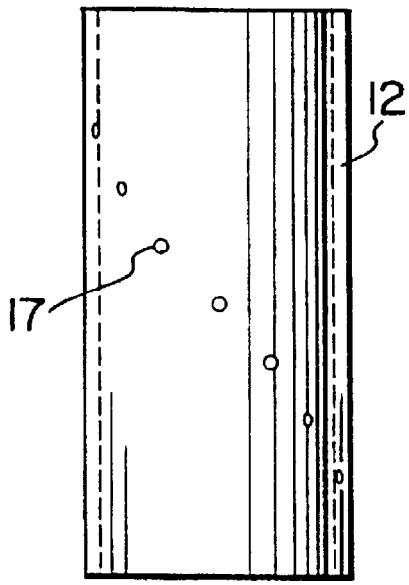
FIG. 2 is a side elevation of an inner cylindrical wall.
Figure 3:
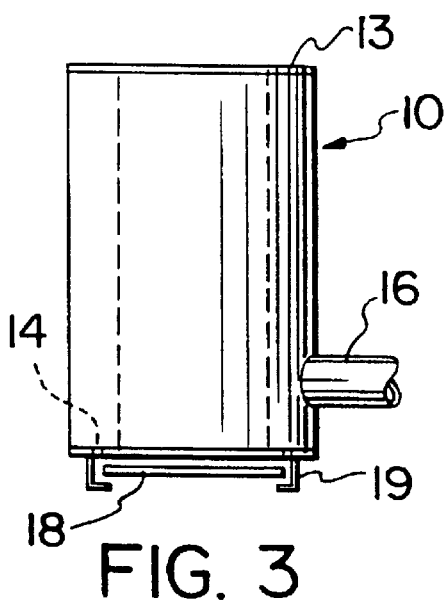
FIG. 3 is a side elevation of the burner of FIG. 1 showing a grate.
Figure 4:
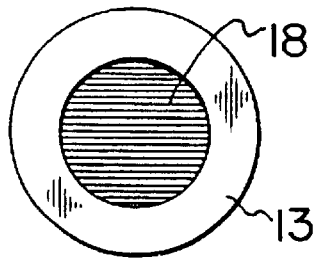
FIG. 4 is a top plan view of the burner of FIG. 3.

The main feature of the present invention is the gasification/combustion chamber 10 as shown particularly in FIGS. 1 and 2. It has an outer cylindrical steel wall 11 and an inner cylindrical steel wall 12 forming an annular chamber 15 therebetween. This annular chamber 15 is closed at top and bottom by means of an annular top plate 13 and an annular bottom plate 14. The inner cylindrical portion of the burner unit is open at top and bottom.

The inner wall 12 contains a series of small holes 17 arranged in a spiral path as can be seen from FIG. 2. A second spiral path of holes is arranged on the opposite face of the inner wall shown in FIG. 2 as a mirror image of the spiral path shown. It will be noted that the first of these holes is located at some distance above the lower end of the cylindrical wall. A connector 16 provides an inlet for combustion air into the annular chamber 15.

Figure 5:
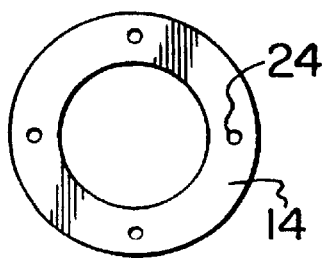
FIG. 5 is a bottom view of the burner of FIG. 3.

As shown in FIG. 5, the annular bottom plate 14 has a series of small holes 24. These allow a small flow of combustion from the chamber 15 into the region of the grate 18 just sufficient to raise the temperature of the pellets on the grate to about 480 to 590° C.

Figures 6, 7:
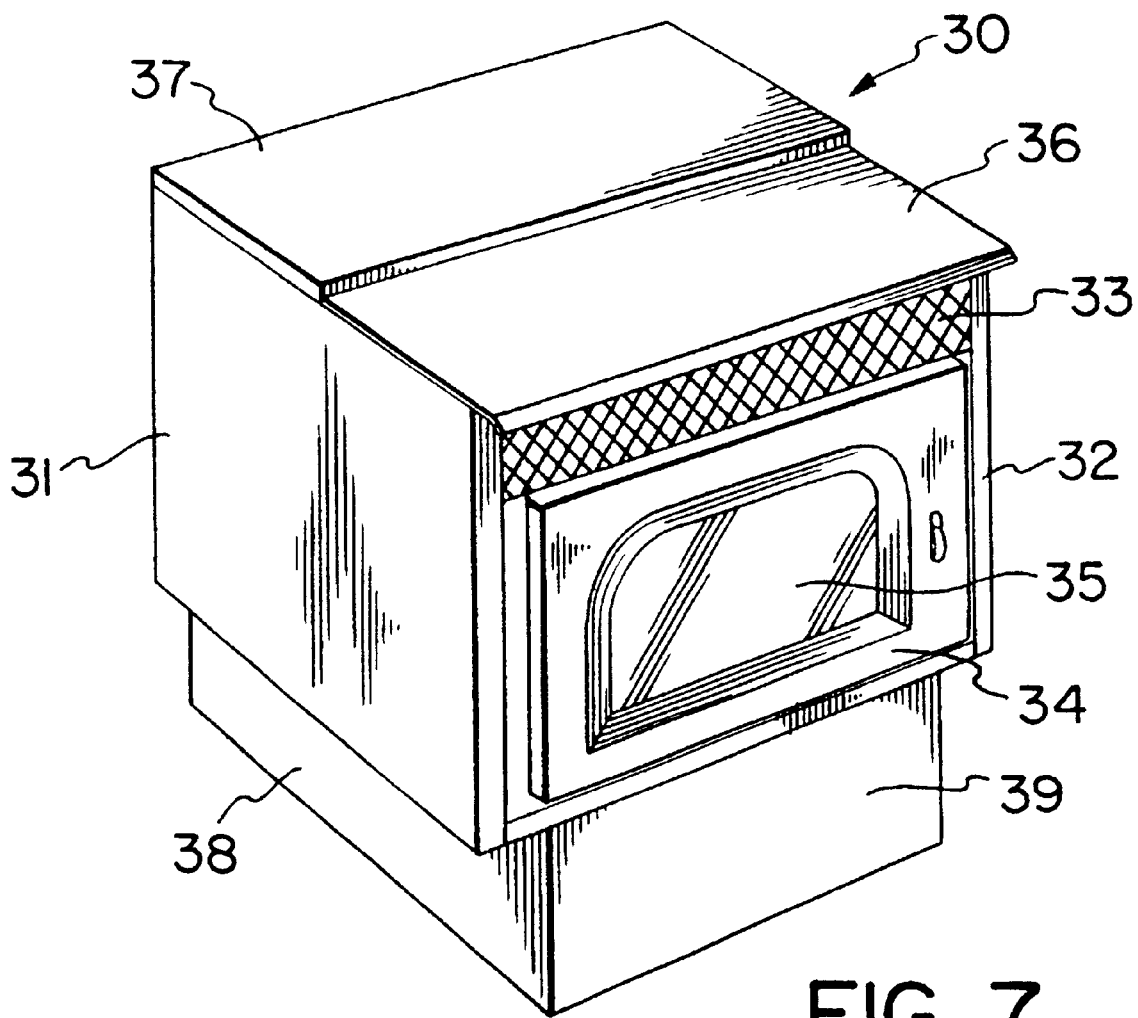
FIG. 6 is a sectional view of the grate.
FIG. 7 is a perspective view of a complete pellet stove using the burner of the invention.

As can be seen from FIGS. 3 to 6, a grate arrangement is provided beneath the burner unit 10 and this grate 18 is held in place by support brackets 19. As shown in FIG. 6, the grate is preferably formed of triangular rods 20 each having a peak or apex 21 and a pair of inclined faces 22. These rods 20 are spaced such that a fresh fuel pellet 23 cannot fall through. However, once the pellet 23 has been substantially carbonized it is capable of falling through between the triangular rods 20. The inclined faces 22 facilitate the flow of loose ash downwardly through the grate.

A typical pellet stove containing the burner of the present invention is illustrated in FIG. 7. This stove 30 includes side walls 31 and front corner pieces 32. A decorative metal grill 33 is positioned at the front top and room heating air is discharged through this grill. A door 34 with a glass 35 provides access to the fire chamber and burner 10. The top of the stove includes a top plate 36 and a door 37 leading to a storage hopper for pellets. The stove is supported on a base 38 which at the front has a door 39 providing access to an ash pan for removing ash.

Figure 8:
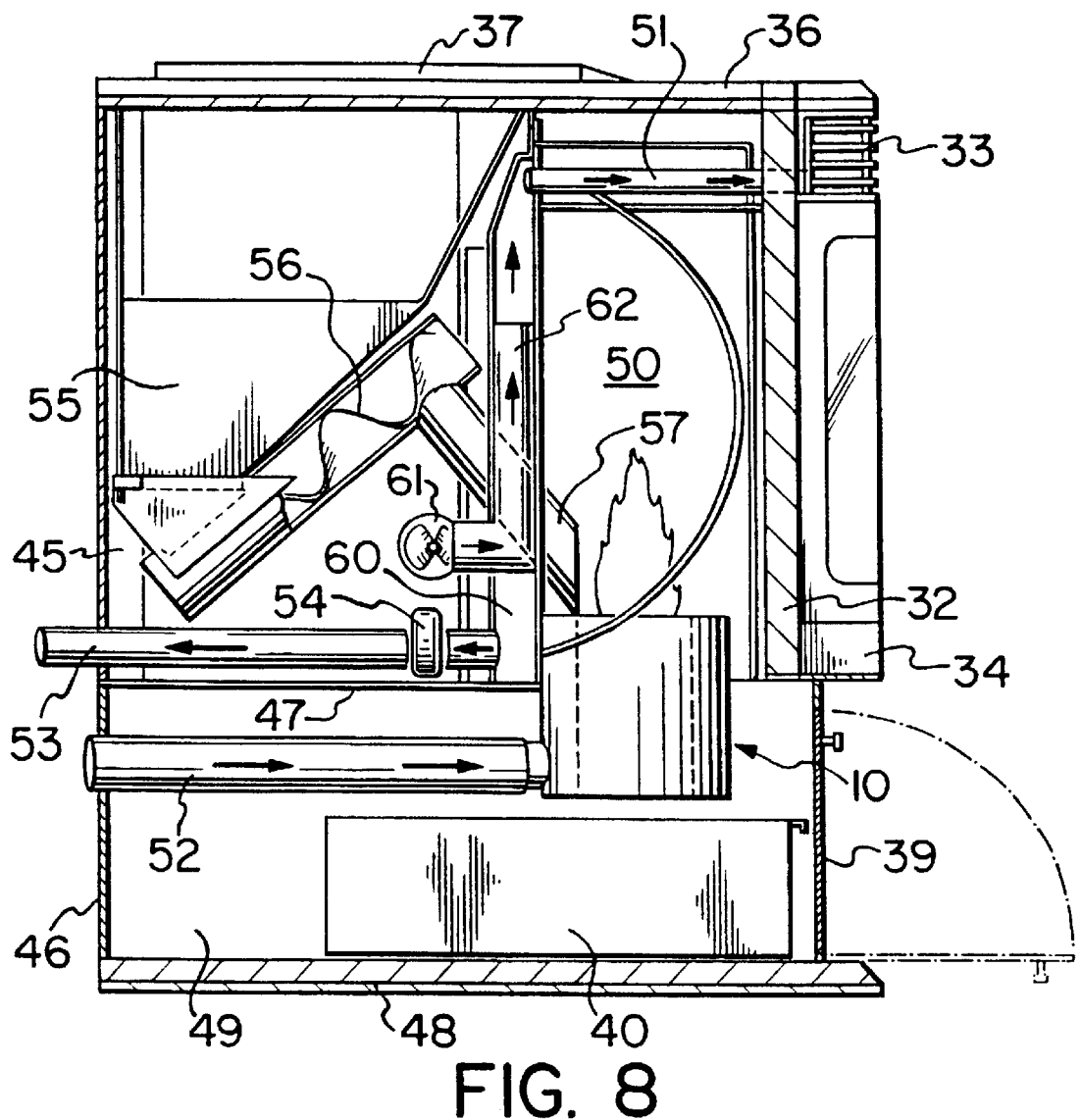
FIG. 8 is a fragmentary cross-section of the stove of FIG. 7.

The details of the stove can better be seen in FIG. 8. In this figure, there can be seen a stove back wall 45 and a base back wall 46 as well as a stove bottom wall 47 and a base bottom wall 48. The base of the stove is in the form of a chamber 49 which is air tight.

The stove portion includes a fire box or chamber 50 and the burner 10 of this invention is sealed in a hole in bottom wall 47 and extends up into the fire box 50. A tube 52 connecting to inlet connector 16 provides combustion air for the burner 10 with exhaust gases being vented through pipe 53 by way of combustion air discharge fan 54. The exhaust gases are withdrawn from the fire box 50 through the exhaust chamber 60. The stove also includes a hopper 55 for storing pellets and this connects to an upwardly inclined auger 56 and a downwardly inclined feed chute 57 for directing pellets into the burner 10.

The room is heated by a circulating air system which includes a fan or blower 61 in the back of the upper stove section. The blower 61 draws in ambient air from the room and blows it up through a heat exchange chamber 62 and then outwardly through a plurality of heat exchange tubes 51 extending across the front of the stove. The air which is heated while passing through the heat exchange chamber 62 and the heat exchange tubes is blown into the room through the grill 33.

In order to operate the system, the door 34 is opened and a small amount of pellets is placed on the grate 18 and these pellets are then ignited. Once a substantial flame has developed, both auger 56 and fan 54 are operated so that a steady supply of pellets is fed into the burner and the combustion air flow is varied to match the combustion rate of the pellets to provide an optimized operation. In full operation, only a small quantity of pellets rest on the grate where they are pyrolyzed to produce combustion gases. These gases are drawn up through the combustion zone of the inner cylindrical wall 12 where they are contacted by super heated air entering through holes 17. Because of the spiral paths of the air holes, the flame has a vigorous swirling motion within the cylindrical combustion zone and extends out the top of that cylindrical zone into the fire box as shown. It is an important feature of this invention that the combustion zone within the inner cylindrical wall 11 has sufficient height that the combustion gases are substantially totally burned within that cylindrical combustion zone.

Sufficient combustion air is permitted into the grate area via holes 24 only to raise the temperature of the pellets to about 480 to 590° C. At this temperature, the pellets pyrolyze to emit combustion gases which are drawn up through the close-coupled cylindrical combustion zone by means of exhaust fan 54. Once these combustion gases come into contact with the super heated air passing through the holes 17, full combustion occurs very quickly with temperatures quickly rising into the order of 1200 to 1370° C. Because of the negative pressure created in the combustion zone by the exhaust fan 54, these widely differing temperatures can be controlled within a quite short distance. This is why the combustion area can be so closely coupled with the pyrolysis area on the grate. A further important advantage of the arrangement as illustrated in FIG. 7 is that the air intake 52 is well below the exhaust 53, thereby creating a natural upward convection flow through the combustion chamber. This means that there is no unexpected blow back of smoke from the flue.

A household pellet stove was constructed based on the design of the above drawings. This stove had a minimum burn setting of 4,415 BTU/hr (10.3 MJ/kg) and a maximum setting of 28,900 BTU/hr (67.2 MJ/kg). The burner had a length of 24 cm, an inner cylindrical wall 12 diameter of 10 cm and an outer cylindrical wall 11 diameter of 16.5 cm. The air inlet holes 17 were arranged at axial spacings of about 25 mm and radial spacings of about 29°. These air inlet holes 17 had diameters of about 3.2 to 2.4 mm and the air inlet 16 had a diameter of about 44 mm.

The pellet feeder was capable of feeding pellets at a rate varying between about 0.28 kg/hr and 1.8 kg/hr. The combustion air blower could be varied from 0.7 to 1.3 $m^3$/min and the convection blower could be varied from 1.0 to 3.5 $m^3$/min. When fired using 8,500 BTU/lb (19.8 MJ/kg) pellet fuel, the stove could be consistently operated at an overall efficiency of about 85%. It gave testing to EPA standards between 0.33 and 0.5 g/hr.

Figure 9:
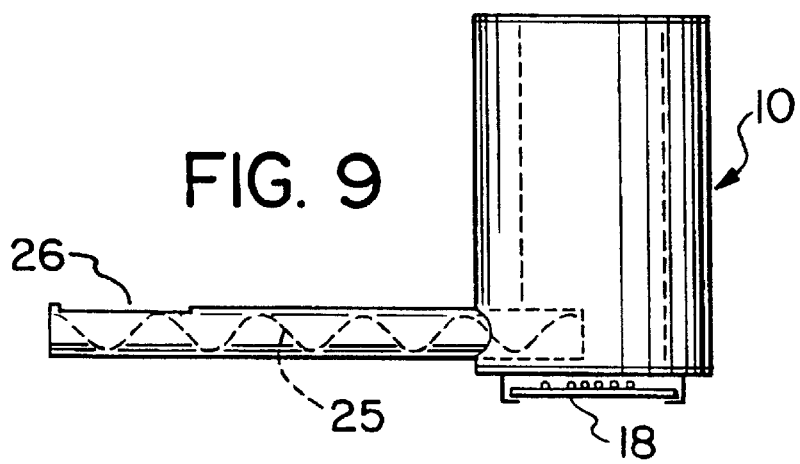
FIG. 9 is a side elevation of a burner with horizontal feed auger.

An alternative form of feeder system is shown in FIG. 9. Here a feed auger 25 extends horizontally through a side wall of burner 10 and into the gasification region of the burner. This auger drops the pellets onto the grate 18. The pellets feed into the auger through inlet 26.

EXAMPLE 1

A test was conducted on the above household pellet stove using wood pellets having the following composition:

Ultimate Analysis (dry basis)

| | | |
|---|---|---|
| Carbon | 48.73% | |
| Hydrogen | 6.87% | |
| Sulphur | 0% | |
| Nitrogen | 0% | |
| Ash | 0.5% | |
| Oxygen | 43.9% | |
| Total | 100% | |

The pellets had a dry calorific value of 19.81 MJ/kg, a moisture content (wet basis) of 5% and an as-fired calorific value of 18.82 MJ/kg. The feed rate was 1.7 kg/hr.

The flue gas had the following composition:

| | |
|---|---|
| $CO_2$ | 9.7% |
| $O_2$ | 10.8% |
| CO | 0.019% |
| Flue Temp. | 139° C. |
| Amb't Temp. | 22° C. |

The ash contained no combustible material and the overall efficiency was determined as follows:

| Losses | MJ/kg dry fuel | MJ/kg as-fired | % |
|---|---|---|---|
| DFG | 1.47 | 1.40 | 7.42 |
| Fuel $H_2O$ | 0.14 | 0.13 | 0.71 |
| $H_2$ | 1.65 | 1.57 | 8.33 |
| CO | 0.02 | 0.02 | 0.10 |
| Comb. in ash | | | 0.00 |
| Total Loss | 3.28 | 3.12 | 16.56 |
| | | % Efficiency | 83.44 |

EXAMPLE 2

Using a basic household pellet stove as described above, a series of different known pellet burner units were used and compared against the pellet burner of this invention.

The results obtained are shown in the following table, in which Units A, B, C, D and E are all known pellet burner units:

| Unit | Burn Rate kg/hr | Stack Temp ° C. | Excess Air % | Particulate g/hr | Efficiency % |
|---|---|---|---|---|---|
| Unit A overfeed stove | 2.1 | 199 | 395 | 2.3 | 61 |
| | 3.7 | 188 | 465 | 1.9 | 59 |
| Unit B overfeed insert | 2.7 | 50 | >1000 | 3.0 | 32 |
| | 3.6 | 77 | >1000 | 5.7 | 49 |
| | 4.6 | 138 | 927 | 14.9 | 32 |
| Unit C underfeed stove | 2.0 | 109 | 972 | 1.4 | 56 |
| | 2.5 | 152 | 729 | 1.5 | 52 |
| | 5.2 | 137 | 729 | 1.1 | 56 |
| Unit D overfeed insert | 1.0 | 98 | 895 | 1.8 | 69 |
| | 1.9 | 119 | 972 | 1.9 | 52 |
| | 2.0 | 138 | 810 | 9.0 | 51 |
| | 2.1 | 99 | 768 | 0.8 | 67 |
| | 3.3 | 222 | 270 | 2.6 | 68 |
| Unit E underfeed | 1.2 | 102 | >1000 | 1.8 | 47 |
| | 1.5 | 101 | >1000 | 2.5 | 38 |

-continued

| Unit | Burn Rate kg/hr | Stack Temp ° C. | Excess Air % | Particulate g/hr | Efficiency % |
|---|---|---|---|---|---|
| stove | 2.1 | 168 | 809 | 1.6 | 54 |
| | 2.3 | 146 | 911 | 2.0 | 44 |
| | 2.3 | 258 | 356 | 9.5 | 55 |
| Burner of this invention | 1.2 | 100 | 81 | 0.3 | 85 |
| | 1.5 | 85 | 109 | 0.3 | 86 |

The particular sizes and equipment discussed above are cited merely to illustrate a particular embodiment of this invention. It is contemplated that the use of the invention may involve components having different sizes and shapes as long as the principals as described above are followed.

What is claimed is:

1. A burner system for burning pellets or granules of solid biomass heating fuel, comprising an air tight combustion chamber having an exhaust outlet in an upper region thereof and a burner means in the bottom thereof for converting the solid fuel to fuel gases and ash in the presence of a limited air supply, said burner means comprising upright co-axial inner and outer cylindrical walls providing a central gasification/combustion chamber surrounded by an annular combustion air manifold, said annular manifold being closed at the top and bottom and having an air inlet in the outer wall and a plurality of spaced apertures in the inner cylindrical wall arranged in at least one spiral path extending up the wall providing air inlets from the annular combustion air manifold to the gasification/combustion chamber, a grate at the bottom of the gasification/combustion chamber for holding solid fuel while allowing ash to pass through, an air tight ash-receiving chamber below the gasification/combustion chamber and fan means adapted to provide a negative pressure in the gasification/combustion chamber to thereby draw combustion air into and upwardly through the chamber with a swirling motion, whereby solid fuel fed to the grate at the bottom of the gasification/combustion chamber is pyrolyzed in the presence of a limited air supply to form combustion gases which are drawn upwardly through the gasification/combustion chamber while contacting heated combustion air entering through said spaced air inlets.

2. A burner system according to claim 1 wherein the air inlet holes are arranged in at least two spiral paths extending up the wall.

3. A burner system according to claim 1, wherein air inlet holes in the region of the grate are adapted to provide sufficient air only to pyrolyze the solid fuel and form fuel gases.

4. A burner system according to claim 1 wherein the spiral arrays of air inlet holes are arranged as mirror images spiral paths on opposite sides of the chamber and are spaced a distance vertically above the grate sufficient to maintain the temperature of the solid fuel below melting temperatures.

5. A burner system according to claim 1 which includes feeder means for feeding solid fuel into the gasification/combustion chamber through the top thereof.

6. A burner system according to claim 1 which includes feeder means for feeding solid fuel in a horizontal path onto the grate at the bottom of the chamber.

7. A burner system according to claim 1 which includes an oxygen sensor in the exhaust outlet, said oxygen sensor being adapted to control the fan speed and thereby the amount of combustion air.

8. A burner system according to claim 1 wherein the grates are formed of parallel triangular shaped rods.

9. A burner system according to claim 1 which includes a pair of vertically spaced grates located below the gasification/combustion chamber.

10. A burner system according to claim 1 mounted in the bottom wall of a fire chamber of a pellet stove.

11. A burner system according to claim 10 wherein the fire chamber has an exhaust gas outlet.

12. A burner system according to claim 11 wherein a fan is mounted in the exhaust gas outlet for providing a negative pressure in the gasification/combustion chamber.

13. A burner system according to claim 12 wherein heat exchange passages surrounded said stove fire chamber and fan means are adapted to circulate room air through said heat exchange passages and back into the room.

14. A burner system according to claim 1 adapted to operate as an air tight system at an air:fuel ratio of less than 8:1.

* * * * *